United States Patent [19]

Tung

[11] Patent Number: 4,990,908
[45] Date of Patent: Feb. 5, 1991

[54] REMOTE POWER CONTROL FOR DUAL LOADS

[76] Inventor: Michael Tung, 10 F-1 No. 181 Fu Shing North Road, Taipei, Taiwan

[21] Appl. No.: 327,899

[22] Filed: Mar. 23, 1989

[51] Int. Cl.$^5$ .................. G08C 19/00; F24F 3/056
[52] U.S. Cl. ....................... 340/825.630; 98/40.07;
307/40; 340/310 R; 340/825.67
[58] Field of Search .................. 340/310 R, 310 A,
625.56-825.68,
340/825.22; 362/253; 307/38, 40; 98/40.05,
40.07; 417/572

[56] References Cited

U.S. PATENT DOCUMENTS

| | | | |
|---|---|---|---|
| 4,222,035 | 9/1980 | Lohoff | 340/310 A X |
| 4,329,678 | 5/1982 | Hatfield | 340/310 A |
| 4,716,409 | 12/1987 | Hart et al. | 340/825.22 |
| 4,719,446 | 1/1988 | Hart | 340/310 A |

*Primary Examiner*—Ulysses Weldon
*Attorney, Agent, or Firm*—Dennis T. Griggs

[57] ABSTRACT

A remote load control system selectively applies power to a ceiling fan and a light from a wall control unit installed in an existing on/off wall switch location. A counter in a control logic circuit is clocked by the AC power input waveform and generates unique control logic signals corresponding to the status of mode select switches. The control logic circuit selectively clips one or more positive half cycles of the input power waveform following a full cycle in response to the actuation of a selected one of the mode select switches. A full AC power waveform corresponding with normal operation is generated when no mode switch is actuated. The control logic signals are input to a gate circuit which controls the on/off operation of a gate controlled power switch. According to this arrangement, mode select signals having a selected number (1, 2, 3 or 4) of positive half cycles of the AC power waveform are clipped following a full cycle of the AC power waveform. The mode select signal are input to a zero state detector which generates unique control logic signals to a microprocessor control receiver mounted on the fan assembly. The output of the zero state detector is a sequence of trigger pulses separated by one or more count pulses. Count pulses which remain logic high longer than a fixed minimum time interval are counted by the microprocessor, and the microprocessor produces a load select instruction which corresponds uniquely with the count.

3 Claims, 5 Drawing Sheets

FIG. 5A RESET
FIG. 5B CLOCK
FIG. 5C CLOCK INHIBIT
FIG. 5D PIN ③
FIG. 5E PIN ②
FIG. 5F PIN ④
FIG. 5G PIN ⑦
FIG. 5H PIN ⑩
FIG. 5I PIN ①

FIG. 6A RESET
FIG. 6B CLOCK
FIG. 6C CLOCK INHIBIT
FIG. 6D PIN ③

FIG. 7A RESET
FIG. 7B CLOCK
FIG. 7C CLOCK INHIBIT
FIG. 7D PIN ③
FIG. 7E PIN ④

FIG. 8A RESET
FIG. 8B CLOCK
FIG. 8C CLOCK INHIBIT
FIG. 8D PIN ③
FIG. 8E PIN ⑦

4,990,908

REMOTE POWER CONTROL FOR DUAL LOADS

FIELD OF THE INVENTION

This invention relates to improvements in controls for electrical appliances, and in particular to a remote load selector for controlling the operation of an electrical motor and light in a combination ceiling fan and light fixture.

BACKGROUND OF THE INVENTION

Electrical appliances such as ceiling fans and lights are designed to be powered by one active (hot) conductor carrying AC current and a neutral return line. Some appliances have multiple functions which may be manually selected by the user.

A ceiling fan which incorporates a light fixture is a multiple function electrical load. Some ceiling fans may be controlled to operate at different speeds, and some light fixtures may be controlled to operate at different light intensity levels.

It is sometimes desirable to replace an overhead light fixture with a combination ceiling fan and electrical light. Power to the fan and light combination is controlled through an on/off wall switch, with AC power being conducted to the fan and light through existing wiring. The on/off wall switch controls power to the fan and light, and other controls such as speed control, direction of rotation and brightness may be provided by manual switches located on the fan assembly and on the light assembly.

In some instances, controls for operating an overhead ceiling fan and light fixture have been incorporated as a part of a wall switch. Such arrangements require the installation of additional wiring between the wall switch and the existing ceiling fixture. It is generally desirable to be able to control the application of power to the combined fan and light from the wall switch location using the existing wiring between the wall switch location and the ceiling fixture for separately controlling and operating the ceiling fan through a range of different speeds, and also for controlling and operating the light fixture through a range of different light levels.

DESCRIPTION OF THE PRIOR ART

One approach to selectively applying power to one or more loads in a group of loads, such as a combination ceiling fan and light, is described in U.S. Pat. No. 4,322,632, in which the loads are selectively energized through an existing pair of power conductors in response to predetermined sequences of wall switch toggling. One load is switched on in response to a single switch closure, and two loads are activated simultaneously by successive switch closures, and a third switch closure activates the second load only. Repeated toggling of the switch is detected by transition detection circuitry to operate the selected device. This involves complete interruption of power to the load during signaling. The sequence of switch operations may be difficult to remember, and does not accommodate additional load control operations such as fan direction, speed control and light intensity control.

Another type of remote load control is shown in U.S. Pat. No. 4,329,678 in which delayed pulse control signals are superimposed on the AC power signal. Each load is controlled by a receiver which is responsive only to pulses having a predetermined phase value. Upon closure of an appropriate switch of a multiple switch assembly, a pulse having a predetermined phase value is produced which is detected by one or more of the receivers to operate the selected load. In this arrangement, both the control signal transmitters and the receivers are connected in parallel across the household power line, and require rewiring. Each appliance load requires its own separate transmitter and receiver with a selected predetermined phase value for operation. This control circuit does not permit different modes of operation of a single appliance, nor does it permit two appliances to be operated simultaneously.

Another ceiling fan and light control system is described in U.S. Pat. No. 4,719,446 in which the fan and light are controlled independently by signals conducted over existing household wiring. In that control system, two wall switches operate the fan alone, the light alone, and the fan plus the light, in response to closure of either one or both of the two wall switches. Delayed pulse signals are produced by closure of the switches during the positive and negative halves of each AC power cycle. An analog voltage level is sensed at a predetermined time interval after a zero crossing of the AC power signal to determine whether a timing delay is present, and a control signal for operating a microprocessor is produced when a delay is detected. Control is interrupted by phase shifting, and is sensitive to line voltage variations. Moreover, the multiple switch operation for a particular load selection must be completed within a predetermined time interval, usually within the first seven seconds after power is turned on.

Yet another ceiling fan and light control system is disclosed in U.S. Pat. No. 4,716,409. In that control system, two electrical appliances such as a ceiling fan and light are operated independently from a remote wall control unit. The wall control unit includes a group of manually operable switches and a firing delay generating circuit responsive to operation of the switches for generating a series of different light control signals, each control signal being generated by actuation of a predetermined one of the switches, with the control signal being generated after a predetermined delay in the AC power waveform and after a predetermined polarity zero cross of the waveform. A detection circuit senses the delay in each half of the AC power wave by sensing the length of the half cycle and producing an output control pulse of equivalent length. A polarity sensing circuit senses the polarity of the delayed half wave and produces a polarity control signal. The polarity control signal and control pulse of the detection circuit are used to control a microprocessor preprogrammed to associate each delayed signal of each polarity with a predetermined control function. The control functions include switching on and off the fan and light. Additionally, control signals for increasing and decreasing the light intensity and for increasing and decreasing the fan speed are provided by increasing the firing delay of the corresponding selection signal.

Other circuits for remotely controlling the application of power to plural loads are shown in the following U.S. Pat Nos. 4,413,211; 4,465,956; 4,430,576; 4,398,178; 4,254,343; 4,538,973; 4,560,909; 4,521,843; 4,110,632; 4,293,915; 4,480,197; 4,528,456.

SUMMARY OF THE INVENTION

The present invention provides a remote load control system for operating two or more electrical loads such as a ceiling fan motor and a light independently from a remote wall control unit mounted at an existing on/off wall switch location. The wall control unit is connected to the existing wiring which conducts power from the wall switch location to a ceiling fixture on which the ceiling fan and light are mounted. A control logic circuit receives the AC power input waveform and generates unique mode select signals corresponding to the status of the mode select switches. The control logic circuit selectively clips one or more positive half cycles of the input power waveform following a full cycle of the power waveform in response to the actuation of a selected one of four switches. A full AC power waveform corresponding with normal operation is generated when no mode switch is actuated.

Upon actuation of a first mode switch, the first positive half cycle following a full cycle of the AC power waveform is clipped, which signals the selection of a first operating mode (Program). Upon actuation of a second mode switch, two successive positive half cycles are clipped following a full cycle of the applied AC waveform, which signals the selection of a second operating mode (Light). Upon actuation of a third mode switch, three successive positive half cycles are clipped following a full cycle of the AC waveform, which signals the selection of a third operating mode (Fan). Upon actuation of a fourth mode switch, four successive positive half cycles are clipped following a full cycle of the AC waveform which corresponds with the selection of a fourth operating mode (Fan Reverse).

The mode select signals are input to a zero cross-over detector which generates unique control logic signals to a microprocessor controlled receiver mounted on the fan assembly. The output of the cross-over detector is a sequence of trigger pulses having very narrow widths. When a load function is selected by momentarily closing one of the mode select switches, the trigger pulses are separated by one or more count pulses having relatively large widths, with the number of large width count pulses corresponding with the actuation of the selected mode switch. The count pulses which remain logic high longer than a fixed minimum time interval are counted by the microprocessor, and the trigger pulses are ignored. The microprocessor produces a load select instruction which corresponds uniquely with the count.

In the preferred embodiment, the four mode switches are connected to selected decoded decimal output stages, respectively, of a decade counter. When actuated, each mode switch connects the selected decoded decimal stage output signal to the reset input of the counter, which causes the counter to repeat the count and produce an output signal after a predetermined number of clock cycle intervals, for example one, two, three or four. The count is repeated and the output signal is generated for as long as the mode switch is manually held in the "on" state. According to this arrangement, four unique mode selection signals are separately generated, with each mode selection logic signal corresponding uniquely with a selected load function.

The mode selection logic signals are input to a gate circuit which controls the on/off operation of a gate controlled power switch. The power switch is gated on to conduct a positive half cycle of the power waveform during clock cycle intervals which coincide with logic high intervals of the mode select logic circuit. The gate signal is terminated to turn the power switch off and thereby block the conduction of positive half cycles of the power waveform during the clock cycle intervals which occur between counts (mode select logic signal low). Negative half cycle AC current is conducted by a bypass diode which is connected in parallel across the gate controlled power switch. According to this arrangement, mode select signals having a selected number (one, two, three or four) of positive half cycles of the AC power waveform are clipped following a full cycle of the AC power waveform.

BRIEF DESCRIPTION OF THE DRAWINGS

The novel features of the invention are set forth with particularity in the claims. The invention will best be understood from the following description when read with reference to the accompanying drawings, wherein:

DETAILED DESCRIPTION OF THE PREFERRED EMBODIMENT

Figure 1:
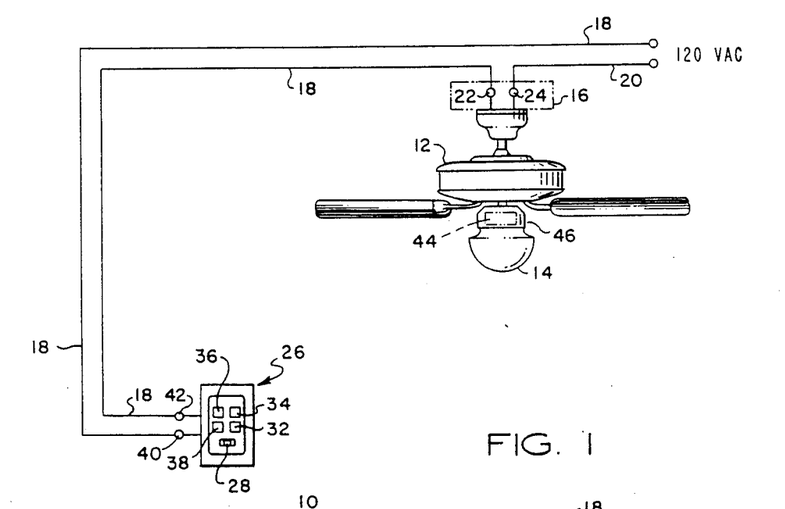
FIG. 1 is a diagram which illustrates the installation of a combined fan and light fixture, with the operation of the fan motor and light being controlled by a remotely located wall control unit.
Figure 2:
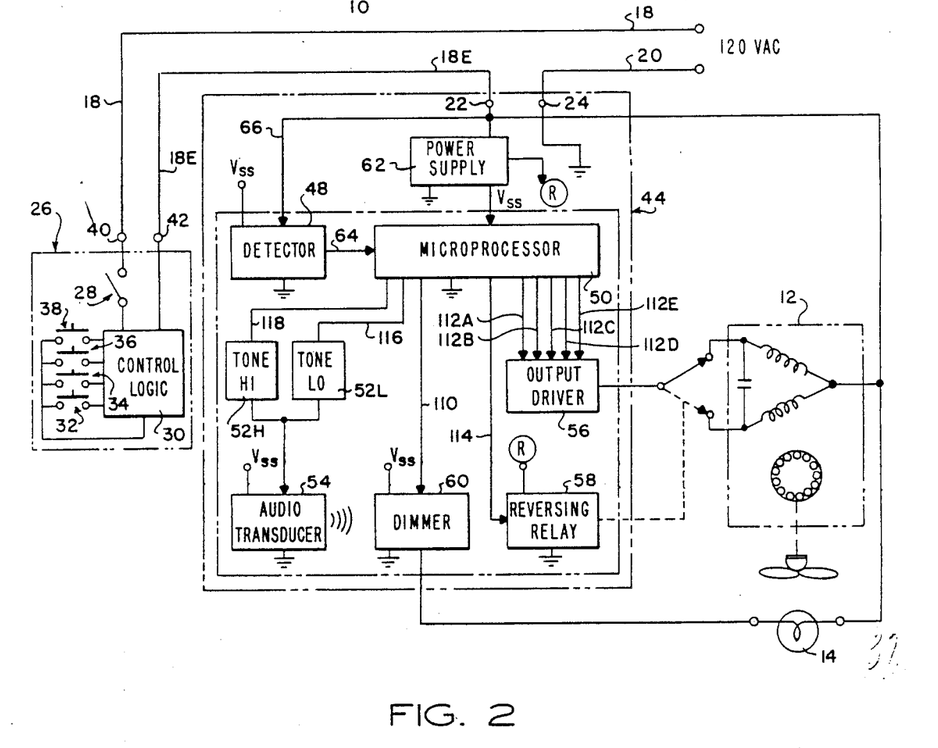
FIG. 2 is a simplified block diagram of a remote control system control system constructed according to the teachings of the present invention.

Referring now to FIGS. 1 and 2, a remote power control system 10 is connected to a source of existing electrical power, such as 120 volts AC, for selectively applying AC power to a ceiling fan 12 and light 14. The ceiling fan and light are suspended from a junction box 16, and AC power is delivered to the combination fan and light fixture by a hot power conductor 18 and a neutral return conductor 20. The hot conductor 18 and the return conductor 20 are applied to the combination fan and light fixture through power connectors 22, 24 which are located within the junction box 16. AC power to the combination fan and light is controlled by a wall control signaling unit 26 which is connected in series circuit relation with the hot power conductor 18 and a switched hot power conductor extension 18E.

The wall control signaling unit 26 includes a single pole, single throw on/off power switch 28 and a control logic circuit 30. The control logic circuit 30 includes four single pole, single throw mode select switches 32, 34, 36 and 38, which correspond with program select, light select, fan select and fan reverse select, respectively. The mode select switches 32, 34, 36 and 38 are spring biased to the open circuit position as shown in FIG. 2. Each mode select switch has a push button, which when depressed closes a circuit, and automatically opens the circuit upon release.

The wall control signaling unit 26 thus includes the on/off power switch 28 and the control logic circuit 30, which form a series electrical circuit with the ceiling fan and light. The wall control unit is connected in series with the hot power conductor 18 and hot power conductor extension 18E by power connectors 40, 42. The control logic circuit 30 within the wall control signaling unit 26 provides output control signals on the switched hot power conductor extension 18E for detection by a receiver 44 which directs operation of the ceiling fan 12 and light 14 under microprocessor control.

The wall control signaling unit 26 is mounted within the pocket of an existing wall mounted switch box, and the receiver 44 is mounted within a light support housing 46 which is suspended from the motor hub of the ceiling fan 12.

The control logic circuit 30 generates control signals (FIGS. 10A, 10B, 10C, 10D and 10E) which are conducted to the receiver 44 through the switched hot power extension conductor 18E in response to actuation of one of the mode switches 32, 34, 36 and 38. The mode switches are normally open, and full AC power is conducted to the ceiling fan and light upon closure of the power switch 28.

The receiver 44 includes a zero state detector 48, a microprocessor 50, HI-LO tone generators 52H, 52L, an audio transducer 54, a multi-stage output driver 56 and a reversing relay 58 which conduct power to the ceiling fan 12, and a dimmer circuit 60 which controls the level of power applied to the light 14. The receiver 44 includes an internal power supply 62 which develops an operating voltage $V_{ss}$ ($-5$ V DC) for energizing the various circuits within the receiver. The receiver components are selectively enabled by the microprocessor 50 according to stored program instructions contained within a read only memory (ROM) within the microprocessor. Predetermined program instructions are implemented by the microprocessor for separately actuating the various components of the receiver according to control logic signals (FIGS. 10A, 10B, 10C, 10D and 10E) generated by the zero state detector 48, and are input to the microprocessor on signal conductor 64.

The mode select signals represented by the waveforms of FIGS. 9A, 9B, 9C, 9D and 9E are generated by the control logic signaling circuit 30, and are input to the zero state detector 48 on a signal conductor 66 which is electrically connected to the hot power conductor extension 18E.

Figure 3:
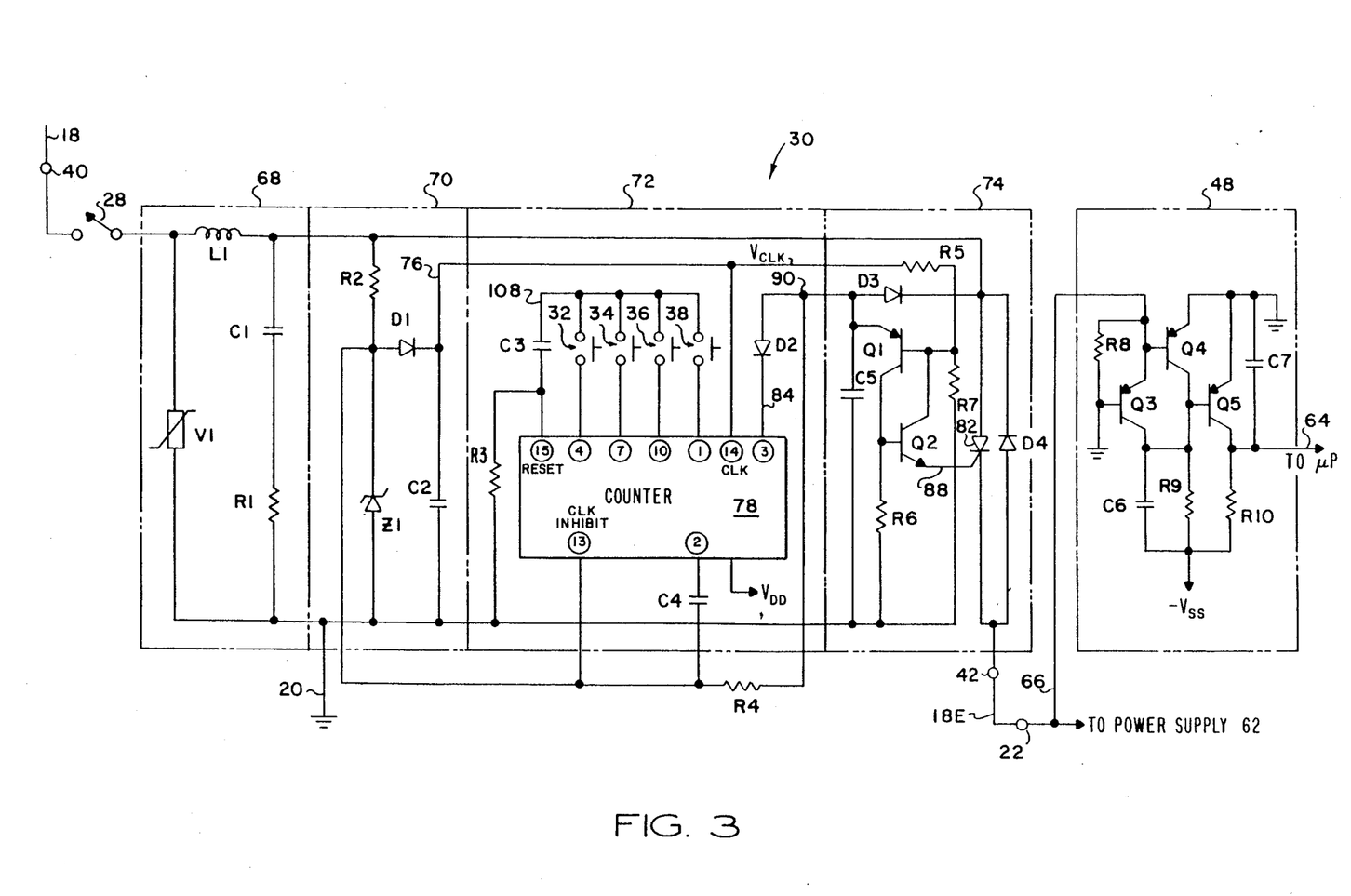
FIG. 3 is a circuit diagram of the wall control unit shown in FIG. 2.

The mode select signaling waveforms of FIGS. 9A, 9B, 9C, 9D and 9E are generated by the control logic signaling circuit 30. Referring to FIG. 3, the control logic signaling circuit 30 comprises a surge suppressor circuit 68, a mode select logic circuit 72 and a power switch logic circuit 74. In this arrangement, the surge suppressor 68 is connected in shunt relation across the hot power conductor 18 and the neutral return conductor 20. The suppressor circuit 68 includes a low pass filter in which a varistor V1 is connected in shunt with an inductor L1, and a snubber circuit formed by the series connection of a capacitor C1 and resistor R1, which are effective for suppressing power surges and high frequency transients which may be propagated along the power conductor 18.

Figure 4:
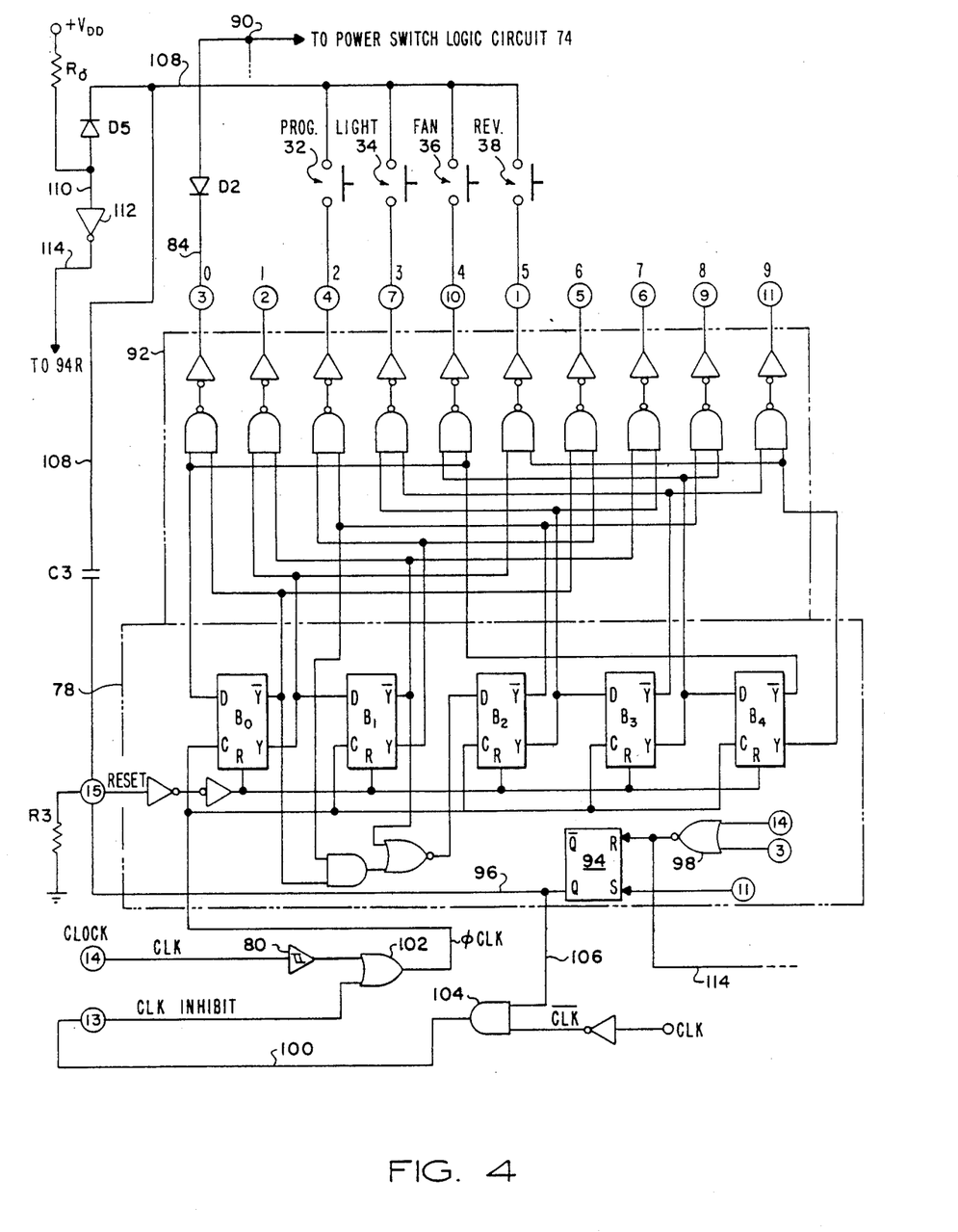
FIG. 4 is a simplified block diagram of the counter shown in the wall control unit of FIG. 3.
Figure 5A:
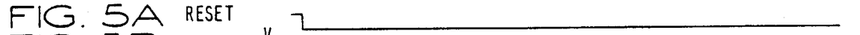
FIGS. 5A, 5B, 5C, 5D, 5E, 5F, 5G, 5H and 5I are waveforms which illustrate the input and output pulses associated with the counter shown in FIG. 4.
Figure 5B:
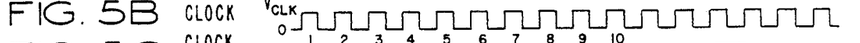
Figures 5C, 5D:
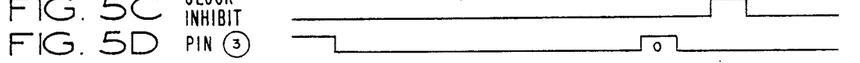
Figure 5E:
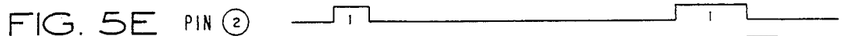
Figure 5F:
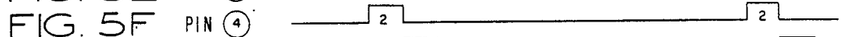
Figure 5G:
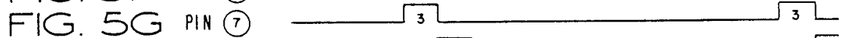
Figure 5H:
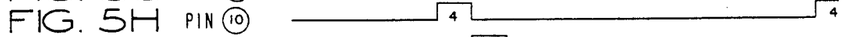
Figure 5I:
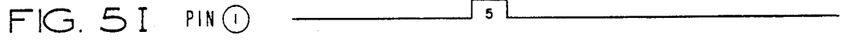

The clock circuit 70 is formed by a current limiting resistor R2 which is connected in series with a Zener diode Z1. Positive excursions of the AC waveform which exceed the rating of the Zener diode Z1 are clipped, thereby producing a voltage, waveform $V_{CLK}$ on lead 76, from which a clock signal CLK is derived as shown in FIG. 5B. A square wave is approximated by a pulse forming circuit composed of the current limiting resistor R2 and a capacitor C3 which are connected in a low pass RC circuit through the steering diode D1. The clock waveform $V_{CLK}$ on lead 76 is further shaped and squared by a Schmidt trigger 80 (FIG. 4) connected in series with the clock input terminal 14 of the counter 78. An internal power supply (not illustrated) develops a DC supply voltage $V_{DD}$ ($+5$ V DC) for operating the counter 78.

Figure 7A:
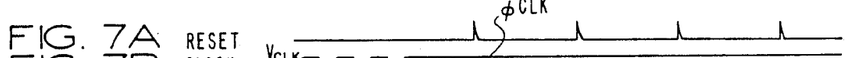
FIGS. 7A, 7B, 7C, 7D and 7E are timing waveforms showing the interrelationship of various waveforms upon actuation of first mode switch.
Figures 7B, 7C:
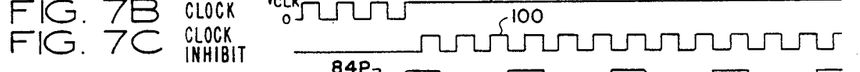
Figure 7D:
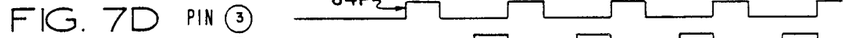
Figure 7E:
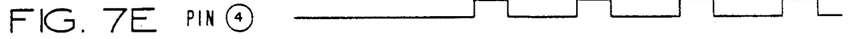
Figures 8A, 8B:
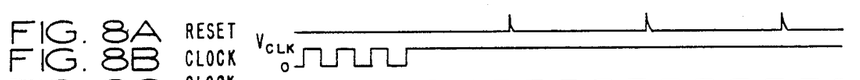
FIGS. 8A, 8B, 8C, 8D and 8E are timing waveforms showing the interrelationship of various timing signals upon selection and actuation of a second mode switch.
Figures 8C, 8D, 8E:
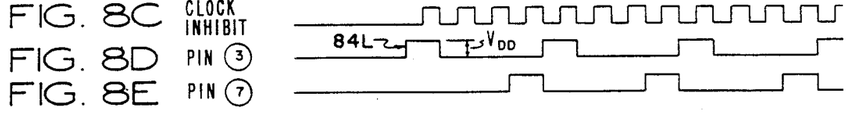
Figures 9A, 9B, 9C:
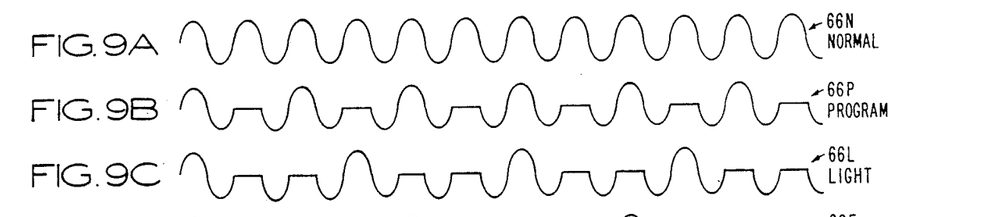
FIGS. 9A, 9B, 9C, 9D and 9E are waveforms showing the output of the control logic circuit of FIG. 3, corresponding respectively with all mode switches open (normal power applied to prior selected function), mode 1 switch closed (Program), mode 2 switch closed (Light), mode 3 switch closed (Fan) and mode 4 switch closed (Fan Reverse); and, FIGS. 10A, 10B, 10C, 10D and 10E are waveforms corresponding with the output of the zero state detector of FIG. 3 which are generated in response to input of the waveform signals of FIG. 9A, 9B, 9C, 9D and 9E, respectively.
Figures 9D, 9E:
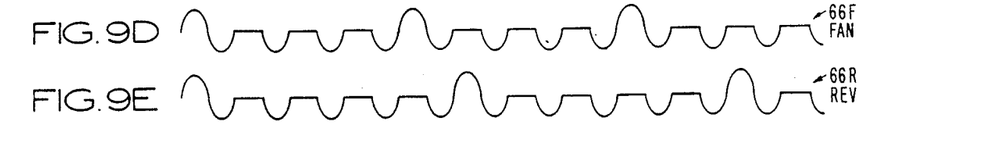
Figure 10A:
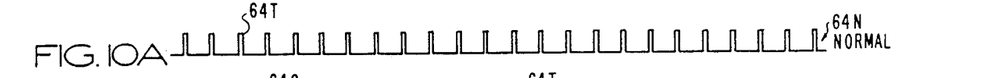
Figures 10B, 10C, 10D:
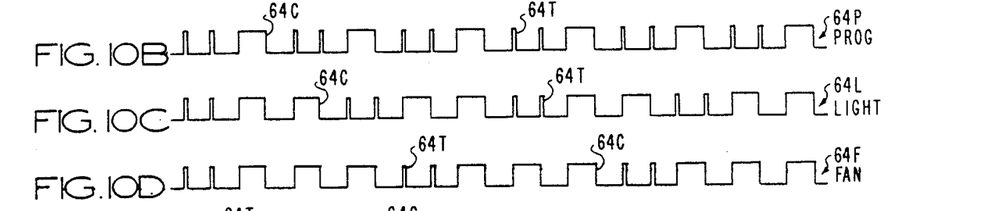
Figure 10E:
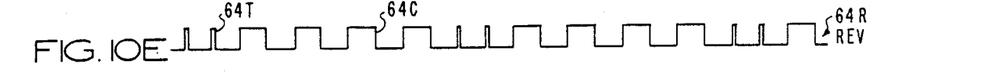

The AC power input waveform 66N, illustrated in FIG. 9A, is conducted through main power switch 28. Negative half cycles of the power waveform are conducted through bypass diode D4 in the power switch logic circuit 74. Positive half cycles of the power input waveform are selectively clipped, as shown in FIGS. 9B, 9C, 9D and 9E, by turning off a silicon controlled rectifier (SCR) power switch 82 in response to a low logic level state of control logic signal 84 as shown in FIGS. 7D and 8D, for example. According to this arrangement, the power switch logic circuit selectively gates the power SCR 82 on and off in response to actuation of a selected one of the four mode switches 32, 34, 36 and 38, with a selected number of positive half cycles of the AC input waveform AC being clipped (not conducted) following a full cycle of the AC input power waveform.

Referring again to FIG. 3, the power switch logic circuit 74 produces a gate signal 88 which rises essentially to $V_{DD}$ (less the emitter-to-collector drops across transistor switches Q1 and Q2) in response to a logic high state of the control logic signal 84 produced by the counter 78.. The control logic signal 84 is coupled to the input node 90 of the power switch logic circuit 74 through a blocking diode D2. The input node 90 is biased by a voltage produced by the voltage divider resistors R2 and R4. The values of R2 and R4 are selected to produce a bias voltage at input terminal 90 which is less than the logic high voltage level of the control logic signal 84, but which is sufficiently high enough to forward bias the emitter-to base junction of transistor Q1.

According to the foregoing bias arrangement, when the control logic signal 84 rises to its logic high level, for example $V_{DD}= +5$ V, the bias voltage at input node 90 will be less than five volts, and diode D2 will be reversed biased. Thus the voltage at input terminal 90 rises to the voltage divider level produced by R2 and R4. A bias voltage is applied to the base of transistor Q1 by bias resistors R5 and R7, with the bias voltage being equal to the R7/R5 divider voltage. The bias voltage applied to the base of transistor Q1 is less than the R4/R2 divider voltage, whereby the emitter-to-base junction of transistor Q1 is forward biased. Thus Q1 turns on and conducts current through resistor R6 when signal 84 is logic high. As a result, transistor Q2 turns on, thereby applying the R7/R5 divider voltage to the gate of SCR diode 82, causing it to turn on and conduct positive half cycles of the applied AC waveform from power connector 40 to power connector 42.

For logic low values (zero) of the control logic signal 84, diode D2 is forward biased, and the bias voltage level on input node 90 is pulled to zero. At the same time, the voltage applied to the base of transistor Q1 is some positive value determined by the R7/R5 divider voltage, and transistor Q1 is turned off. With transistor Q1 turned off, its emitter-to collector junction is open, and no current is conducted through its emitter. No base-to-emitter is developed across Q2, and it is turned off. With Q2 in the off state, the gate signal 88 is at the zero voltage level, and the SCR power switch 82 is in the off state, thereby blocking positive half cycle current flow from power connector 40 to power connector 42.

Figure 6A:
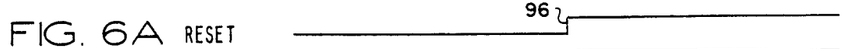
FIGS. 6A, 6B, 6C and 6D are waveform diagrams which illustrate the interrelationship of various waveforms when the counter of FIG. 4 is in the reset mode.
Figure 6B:
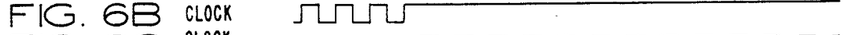
Figure 6C:
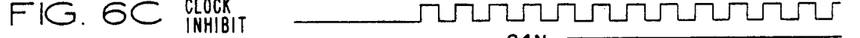
Figure 6D:
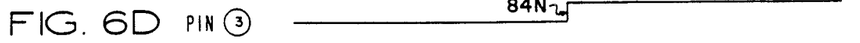

FIG. 6D illustrates a mode select signal 84N corresponding with normal operation (no switches actuated). In this operating mode, the logic output of the counter rises to a logic high value after a start-up interval, and remains at the logic high level until such time as the counter 78 is reset. During operation in the normal mode, the diode D2 is reverse biased, and transistors Q1 and Q2 are turned on, and the gate controlled SCR switch 82 is gated on. As a result, the full AC power wave is conducted from power connector 40 to power connector 42, with positive half cycles being conducted through the SCR switch 82, and negative half cycles being conducted through the shunt diode D4.

Representative control logic signal waveforms 84P and 84L are shown in FIGS. 7D and 8D, respectively. In FIG. 7D, the logic level of the control logic signal 84P rises to logic 1 for one clock cycle, and then assumes logic 0 state for the next two consecutive clock pulses. This sequence is repeated for as long as switch 32 is depressed.

In the waveform example shown in FIG. 8D, the logic level of the control logic 84L signal rises to logic 1 value for one clock cycle, and assumes a logic 0 state for the next three successive clock cycles. Similarly, the high-low-low pattern is repeated for as along as switch 34 is depressed.

The actuation of switch 32 corresponds with the selection of the program operating mode, and the waveform 66P shown in FIG. 9B is produced on the output 66 of the power switch logic circuit 74. According to this arrangement, five unique mode select signals 66N, 66P, 66L, 66F and 66R are generated according to the actuation status of the switches 32, 34, 36 and 38. The normal mode select signal 66N is produced when none of the switches 32, 34, 36 or 38 are actuated; the program mode select signal 66P is generated when switch 32 is actuated; the light mode select signal 66L is generated when switch 34 is actuated; the fan mode select signal 66F is generated when switch 36 is depressed; and with the reverse fan select signal 66R is generated when switch 38 is depressed.

The operation of the counter 78 to produce the control logic signal 84 will be described with reference to FIGS. 3 and 4. In FIG. 4, the counter is organized as a five-stage decade counter having ten decoded outputs numbered 0–9, respectively. The counter inputs include a clock input 14, a clock inhibit input 13, and a reset input 15. A capacitor C3 and resistor R3 form a differentiator circuit for shaping the reset input signals. The counter includes five binary stages $B_0$, $B_1$, $B_2$, $B_3$ and $B_4$ interconnected in a five-stage Johnson decade counter arrangement. The binary stages are advanced one count at the positive clock signal transition if the CLOCK INHIBIT signal is low. Counter advancement via the clock line is inhibited when the CLOCK INHIBIT signal on pin 13 is logic high. A logic high value of the RESET signal on pin 15 clears the counter 78 to it zero count.

Each binary stage $B_0$, $B_1$, $B_2$, $B_3$ and $B_4$ is a D flip-flop, having a reset input R, a clock input C, a delay output D and binary outputs Y, $\overline{Y}$. The binary outputs Y, $\overline{Y}$ and the delay output D of each binary are coupled to a binary coded decimal (BCD) to decimal converter 92. The binary outputs of the five binary stages are decoded and converted to decimal by an array of logic gates and inverters within the BCD code converter 92. The decoded outputs of the BCD converter 92 are normally at logic low level and rise to logic high level only during their respective decoded output time interval. Each decoded output remains at the logic high level for one full clock cycle.

Referring now to FIG. 4 and FIGS. 6A, 6B, 6C and 6D, the counter initially has its input signal RESET at logic 0, and the control logic signal 84 is at logic 0. When the final decoded decimal output "9" is reached (10th clock pulse), an S-R flip-flop 94 generates a reset pulse 96 which clears the counter 78 to its zero count. The "0" decoded output (pin 3) also transitions to logic high level at this time. Coincidence of the clock low and the decoded "0" count output (pin 3) resets the S-R flip-flop 94 to enable the counter. The clock signal CLK on pin 14 is connected to one input of a NOR gate 98. The "0" decoded decimal count output (pin 3) is applied as a second input to the NOR gate 98. Coincidence of the clock low and the decoded "0" decimal count output low produces a logic high signal to the reset input of the S-R flip-flop 94 to enable the counter 78 for the next count sequence.

Decimal count pulse outputs "0" through "9" are thus produced by the counter 78 at the output pins of the BCD converter 92, with the first five such output count pulses being illustrated in the timing diagrams shown in FIGS. 5D, 5E, 5F, 5G, 5H and 5I.

During normal operation, that is when none of the mode switches 32, 34, 36 or 38 are actuated, the counter cycles initially through its count, automatically resets and produces a logic high output on the "0" decimal count output pin 3 (control logic signal 84N), and sets the S-R flip-flop 94, with the timing conditions being as shown in FIGS. 6A, 6B, 6C and 6D. The count is then inhibited by the CLOCK INHIBIT signal, so that the logic high state of count output "0" pin remains logic high indefinitely, until the next reset pulse.

Under normal operating conditions, when all of the mode select switches are in the open circuit condition as shown in FIG. 4, the control logic signal 84N is logic high, diode D2 is reverse biased, and the input node 90 of the power switch logic circuit 74 rises to the R4/R2 voltage divider level, thus turning on the gate controlled SCR power switch 82. Thus during normal mode operation, the full AC power waveform as shown in FIG. 9A is conducted from hot power conductor 18 to hot conductor extension 18E, and the full AC power waveform is made available at power connector 22 for energizing the fan and light.

The coincidence of the next clock low and decoded "0" count output low resets the S-R flip-flop 94, and the Q output of the S-R flip-flop 94 goes logic low. The CLK INHIBIT signal goes logic low, and the counter 78 is thereafter clocked by the signal CLK. Upon reset, the counter decimal output "0" is at logic 1.

Upon reset of the "0" count output to logic 1, the clock signal CLK is inhibited, producing the signal CLK which remains at logic high as long as the clock inhibit signal ØCLK inhibit on lead 100 is enabled. Under this condition, the binaries $B_0$, $B_1$, $B_2$, $B_3$ and $B_4$ are not cycled, and the decimal "0" count signal output on pin 3 remains at logic high condition until one of the mode select switches is actuated to apply a new reset pulse.

The signal ØCLK is generated by applying the clock signal CLK and the CLK INHIBIT signal on lead 100 as inputs to an OR gate 102. The CLK INHIBIT signal on lead 100 is generated by an AND gate 104 whose inputs are the Q logic output of the S-R flip-flop 94 and the complement clock signal $\overline{CLK}$. Thus, upon producing a set condition the S-R flip-flop 94, the output Q is high, a reset pulse 96 is applied to the input pin 15 of the counter, and the Q output of the S-R flip-flop rises to the logic high state, which is applied to the input of the AND gate 104 through conductor 106. When this occurs, the count is inhibited by the signal ØCLK, the binary stages stop cycling, and the decimal "0" count output pin 3 remains at the logic high level.

After the initial reset condition has been achieved, the power waveform 66N will be conducted from the hot power conductor 18 to the power conductor extension 18E without interruption. When it is desired to signal the microprocessor 50, one of the mode select buttons 32, 34, 36 and 38 is momentarily closed, which applies a reset pulse to the reset input R of the S-R flip-flop 94. Prior to depressing one of the switches, the decimal count outputs corresponding with counts 1 through 9 are at logic 0. The switches are connected in common to a reset signal conductor 108, which is connected to the capacitor C3 RESET input of the counter 78. The input 110 of an inverter 112 is also connected to the reset signal conductor 108 through a blocking diode D5. The inverter input 110 is also coupled to $+V_{DD}$ through isolation resistor $R_o$. The inverted output 114 is applied to the reset input terminal R of the S-R flip-flop 94.

According to the foregoing arrangement, when none of the switches are actuated, the voltage level at the input 110 of the inverter 112 is at $+V_{DD}$, and the output of the inverter 114 is at 0. Upon pressing one of the switches, the input of the inverter 112 is pulled to 0 through blocking diode D5, and its output on lead 114 rises to $+V_{DD}$. Accordingly, a logic high reset signal on lead 114 is applied to the reset input R of the S-R flip-flop 94 upon actuation of one of the mode select switches. Upon reset of the S-R flip-flop 94, the CLK INHIBIT signal on lead 100 is disabled, and the binary stages of the clock 78 are then clocked by the clock signal CLK through the OR gate 102.

Assuming that switch 32 is depressed, the output on decimal count "0" output pin 3 is the signal 84P, as shown in FIG. 7D. The signal 84P falls to logic zero and then rises to logic high after a count of two clock cycles, falls to logic low for two clock cycles, and then rises again to logic high. Each time the output rises to logic high, a logic high reset pulse (FIG. 7A, 8A) is applied on signal conductor 108 to the C3 reset input of the counter 78. This decimal count "2" sequence is repeated for as long as mode select switch 32 is depressed.

Similarly, as the light mode select switch 34 is depressed, the signal 84L is produced, as shown in FIG. 8D, with the logic level rising upon reset, and then falling to logic low level for the next three clock pulses, and the decimal count "3" sequence is repeated for as long as the light mode select switch 34 is held in the closed circuit position.

Upon release of the mode select switch, the count continues until the final decimal output (count "9", pin 11) is reached, and at that time the counter 78 returns to the reset mode and the S-R flip-flop 94 sets automatically as previously discussed.

Referring now to FIGS. 2 and 3, the encoded output waveform 66 of the power switch logic circuit 74 is input to a zero state detector 48 which is contained within the receiver 44. The zero state detector 48 decodes the signal information contained within the various mode select signals 66N, 66P, 66L, 66F and 66R. The zero state detector 48 converts the mode select signals to the waveforms 64N, 64P, 64L, 64F and 64R as shown in FIGS. 10A, 10B, 10C, 10D and 10E, respectively.

When the detector 48 receives a positive half wave, the base-to-emitter junction of the transistor Q3 will be forward biased, since the cross-over detector circuit is energized by a negative voltage $-V_{ss}$. The transistor Q3 turns on and is in the conducting mode, while Q4 will be reverse biased and in the off condition.

When the detector circuit 48 receives a negative half cycle, the base-to-emitter junction of transistor Q3 will be reverse biased, and Q3 will be turned off, while Q4 will be forward biased and will be turned on in the conducting mode.

When the signal 66 transitions through a zero level, Q3 and Q4 will be turned off, while Q5 will be forward biased in the conducting mode. When any one of Q3 or Q4 are in the conducting mode, Q5 will be turned off. When both Q3 and Q4 are turned off, Q5 will be in the conducting mode.

The resistors R8 and R9 are selected to provide the appropriate bias voltage levels at the bases of transistors Q3 and Q5. Resistor R10 is a current limiting load resistor which is connected to the collector of transistor Q5. Accordingly, the control logic signal 64 rises to the logic high state only in response to a zero level signal at the input to the detector 48. The zero input state occurs during a zero cross transition, and also during the clock cycle intervals that the positive half cycles of the applied waveform are blocked. The resulting pulse train has narrow trigger pulses 64T and relatively wide count pulses 64C as shown in FIGS. 10A–10E.

Referring now to FIG. 2, the control logic signal 64 is input to the microprocessor 50. The program instructions stored in a read only memory (ROM) in the microprocessor instructs the microprocessor to sense the level of the applied signals after four milliseconds following a positive trigger pulse 64T. This determines the state of the rising edge when the voltage rises from a low level to a high level. If the microprocessor detects a logic high level signal after four milliseconds following a rising edge transition, it is instructed to take the count. That is, the microprocessor counts the number of count pulses 64C to determine which one of the four mode select codes has been selected at any given time, and initiates a programmed sequence of events whenever hat code is validated.

When power is initially switched on by closure of main power switch 28, the microprocessor 50 resets and initializes as follows:

(1) The status of light 14 is set Off.
(2) The light intensity is controlled on signal conductor 110 to be high.
(3) The fan power is set to Off.
(4) The fan speed setting is set to low speed through fan speed select 112A.
(5) The reversing relay status is checked on conductor 114 and is set to direct air flow in a downward direction.

The microprocessor 50 then continually monitors the control logic signal 64 for the presence of count pulses 64C.

By the different counts associated with the number of positive half cycles which are clipped, the microprocessor will decide its output which will be transmitted selectively to each selected load, operate each function of the fan or light, and will generate a high tone, a low tone or a sequence of high and low tones through the audio transducer 54 to announce and confirm the selection of each command.

It will be appreciated, therefore, that through use of the wall control signaling unit 26 and the microprocessor controlled receiver 44 that the fan 12 can be turned on and off and varied in speed and direction, and the light 14 can be turned on and off and varied in intensity in accordance with signals provided from the wall control signaling unit 26. Since control is provided from the wall control signaling unit, pull chains or other fan-mounted switches are not required. The fan and light, including their various operating modes, are completely controllable from the remotely located wall control signaling unit 26. Moreover, the various operating modes are selected simply by pressing a single switch, and toggling is not required.

Although the invention has been described with reference to a specific embodiment, and with reference to a specific fan/light combination, the foregoing description is not intended to be construed in a limiting sense. Various modifications of the disclosed embodiment as well as alternative applications of the invention will be suggested to persons skilled in the art by the foregoing specification and illustration. For example, the remote power control system 10 of the present invention may be used to good advantage in connection with the selection of remote pump loads in an industrial process. It is therefore contemplated that the appended claims will cover any such modifications or embodiments that fall within the true scope of the invention.

What is claimed is:

1. A power control system for use in combination with AC wiring installed between a switch location and a remote fixture of the type having plural electrical loads, said AC wiring having an active power conductor and a neutral power conductor which make AC power available to said plural loads, said power control system comprising a control signaling unit mountable at said switch location and a receiver mountable on said remote fixture, said control signaling unit including:

a manually operable main power switch having switched and unswitched terminals connectable in series electrical relation with said active power conductor;

a plurality of manually operable mode select switches, each mode select switch having an open circuit operating state and a closed circuit operating state;

a control logic circuit having a plurality of input terminals coupled to said mode select switches, respectively, and having an output terminal for generating a repetitive count pulse which transitions between first and second logic levels after a predetermined number of count intervals, the number of count intervals between successive count pulses uniquely corresponding with the operation of a selected one of said mode select switches in a predetermined one of said operating states;

a gate controlled power switch having a control gate terminal, an input power terminal connectable to the switched terminal of said power switch and having an output power terminal connectable to an extension of the active power conductor which conducts power to said remote fixture, said gate controlled power switch being operable in a closed circuit conducting mode in response to the application of a turn-off signal to said control gate terminal, and being operable in an open circuit non-conducting mode in response to the application of a turn-off signal to said control gate terminal;

a bypass rectifier connected in parallel circuit relation across said gate controlled power switch for conducting predetermined polarity half cycles of said AC power waveform and blocking the opposite polarity half cycles of said AC power waveform;

a power switch gate circuit having an input terminal coupled to the output terminal of said control logic circuit and having an output terminal coupled to the gate terminal of said gate controlled power switch, said power switch gate circuit being responsive to a predetermined one of said first and second count pulse logic levels for applying a turn-on signal to the gate terminal of said gate controlled power switch, and being responsive to the other count pulse logic level to apply a turn-off signal to the gate terminal of said gate controlled power switch;

a zero state detector having an input terminal and an output terminal, said detector input terminal being coupled to the output terminal of said logic gate controlled power switch for generating a trigger pulse in response to each zero cross transition of the AC power waveform on the output terminal of the gate controlled power switch, and for generating a command pulse in response to a zero state condition of the output AC power waveform on the output terminal of the gate controlled power switch; and, said receiver having an input terminal connected to the output terminal of the zero state detector, said receiver including programmable control means having stored program instructions for controlling the application of power to one or more of said plural loads in response to coded commands corresponding with the number of command pulses generated between trigger pulses.

2. A control system for selectively applying an AC power waveform from a signaling location to a plurality of remote loads comprising, in combination:

a plurality of mode select switches, each mode select switch having an open circuit operating mode and a closed circuit operating mode;

a control logic circuit having an input terminal, an output terminal, and including multiple stage counter having a clock input terminal for receiving a clock signal, said mode select switches being coupled to said counter for generating a repetitive count pulse which transitions between first and second logic levels after a predetermined number of clock cycles, the number of clock cycles between successive count pulses uniquely corresponding with the operation of a selected one of the mode select switches in a predetermined one of said operating modes;

a gate controlled power switch having an input terminal for receiving the AC power waveform, a gate terminal and a power output terminal, and including a bypass rectifier connected in parallel across the input and output terminals of said gate controlled power switch for conducting predetermined polarity half cycles of said AC waveform and blocking the opposite polarity half cycles of said AC waveform;

a power switch gate circuit having an input terminal connected to the output terminal of said control logic circuit and having an output terminal connected to the gate terminal of said gate controlled power switch, said power switch gate circuit being operable to turn said gate controlled power switch on in response to a predetermined one of said first and second count pulse logic levels and thereby conduct the positive and negative half cycles of the AC power waveform, and being operable to turn said gate controlled power switch off in response to the other count pulse logic level, whereby only half cycles of a predetermined polarity of said AC waveform are conducted through the bypass rectifier when said gate controlled power switch is turned off;

a zero state detector having an input terminal and an output terminal, said detector input terminal being coupled to the output terminal of said gate controlled power switch for generating a logic high output signal on the detector output terminal in response to a zero state condition of the AC power waveform conducted by said power switch and said bypass rectifier and for generating a logic low output signal on the detector output terminal in response to a non-zero state of the AC power waveform conducted by said power switch and said bypass rectifier, whereby narrow width trigger pulses are generated in response to a zero cross transition of said AC power waveform, and whereby relatively wide width count pulses are generated during intervals in which the AC power waveform conducted by the said power switch and said bypass rectifier is in the zero state condition; and, a receiver having an input terminal connected to the output terminal of the detector, said receiver including a microprocessor having stored program instructions for selectively applying power to said plural loads in response to coded commands corresponding with the number of logic high command pulses which follow one or more trigger pulses.

3. A control system for selectively applying an AC power waveform from a signaling location to a plurality of remote loads comprising, in combination:

a plurality of mode select switches, each mode select switch having an open circuit operating mode and a closed circuit operating mode;

a counter circuit coupled to the mode select switches for generating a plurality of unique control logic signals corresponding to the open circuit and closed circuit operating modes of the mode select switches;

a gate controlled power switching circuit having an input terminal adapted for connection to the AC power waveform, a control gate terminal coupled to said counter circuit for receiving the control logic signals, and having an output terminal for conducting positive and negative half cycles of the AC power waveform;

a bypass rectifier connected in parallel across the input and output terminals of the gate controlled power switching circuit for conducting half cycles of a predetermined plurality of the AC power waveform;

a power switch gate circuit connected to said counter circuit for receiving the control logic signals, said power switch gate circuit having an output terminal connected to the gate terminal of said power switch for turning said power switch on and off in response to predetermine logic values of said control logic signals;

a zero state detector having an input terminal coupled to the output terminal of the gate controlled power switching circuit for generating a first logic signal in response to a zero state condition of the AC power waveform conducted by the power switch and by the bypass rectifier, and for generating a second logic signal in response to a non-zero state of the AC power waveform conducted by the power switch and by the bypass rectifier; and a receiver having an input terminal connected to the zero state detector, said receiver including a microprocessor having stored program instruction adapted for selectively applying power to the plural loads in response to the control logic signals produced by said zero state detector.

* * * * *